United States Patent
McAnally et al.

[19]

[11] Patent Number: 5,995,364
[45] Date of Patent: Nov. 30, 1999

[54] HARD DISK DRIVE MOUNTING BRACKET

[75] Inventors: Andrew McAnally; Stephen Cook, both of Georgetown; Blake West, Austin, all of Tex.

[73] Assignee: Dell Computer Corporation, Austin, Tex.

[21] Appl. No.: 08/901,864

[22] Filed: Jul. 28, 1997

[51] Int. Cl.[6] ................................................ G06F 1/16
[52] U.S. Cl. .............................. 361/685; 361/725
[58] Field of Search ................................ 361/683, 685, 361/695, 724, 725; 248/300; 312/223.1, 223.2, 330.1

[56] References Cited

U.S. PATENT DOCUMENTS

| | | | |
|---|---|---|---|
| 4,979,909 | 12/1990 | Andrews | 361/685 |
| 5,025,339 | 6/1991 | Kanno et al. | 360/99.06 |
| 5,216,582 | 6/1993 | Russell et al. | 361/395 |
| 5,223,996 | 6/1993 | Read et al. | 360/97.02 |
| 5,366,200 | 11/1994 | Scura | 248/632 |
| 5,426,562 | 6/1995 | Morehouse et al. | 361/685 |
| 5,564,804 | 10/1996 | Gonzalez et al. | 312/223.2 |
| 5,566,383 | 10/1996 | Gildea et al. | 361/685 |
| 5,768,097 | 6/1998 | Jelinger | 361/683 |

*Primary Examiner*—Lynn D. Feild
*Assistant Examiner*—Lisa S. Lea-Edmonds
*Attorney, Agent, or Firm*—Haynes & Boone, L.L.P.

[57] ABSTRACT

A computer system includes a chassis and a hard disk drive mounting bracket rotatably attached to the chassis. A portion of the bracket includes a resilient surface formed therewith and extending into sliding engagement with the chassis. An alignment tab is attached to the bracket and extends therefrom into engagement with a groove in the chassis for guiding the bracket to a secured position. A securing tab is attached to the bracket and extends therefrom for engaging the chassis and securing the bracket in the secured position.

13 Claims, 7 Drawing Sheets

HARD DISK DRIVE MOUNTING BRACKET

BACKGROUND

The disclosures herein relate generally to hard disk drives and more particularly to a damping mechanism for limiting unwanted shock loads from being induced on a hard disk drive during installation.

Hard disk drives are typically attached to a bracket before being installed into a computer chassis. The bracket may be hinged on one side of the chassis and then rotated into final position and attached with a screw. When the computer chassis and hard drive bracket are in the correct orientation where gravity can assist in installation, the bracket can rotate rapidly and slam into a seated and secured position, which can damage the hard drive due to the induced shock load. Although steps are taken to train assembly personnel to prevent such shock loads during assembly, there are still occurrences and the resulting damage potential remains present. Such damage is also possible during maintenance procedures and anytime when the hard drive bracket is rotated out of its secured position in the chassis.

Numerous shock and vibration damping mechanisms have been proposed to prevent damage to hard disk drives. Such mechanisms are directed to protection of hard disk drives by mounting the drives to include a vibration and shock damping structure which protects the drive during use and handling of the computer. There are multiple piece assemblies which include hard drive brackets and ground springs that function to damp the vibration produced by the hard drive during operation. However, these mechanisms do not provide for protection of the hard disk drive during the steps of assembly where shock damage can also occur.

Therefore, what is needed is a method and apparatus for damping shock loads imposed on a hard disk drive mounted in an associated bracket during assembly.

SUMMARY

One embodiment, accordingly, provides impact shock protection for hard disk drives mounted on a hard drive bracket. The bracket is prevented from rapid rotation and sudden stopping in a mounting position within a computer chassis during the assembly process. To this end, a computer system includes a hard disk drive mounting bracket for rotating attachment to a computer chassis. A portion of the bracket includes a spring thereon for contact with the chassis. An alignment tab is attached to the bracket and extends therefrom for supporting the bracket during rotating movement thereof. A securing tab is attached to the bracket and extends therefrom for securing the bracket in a secured position on the chassis.

A principal advantage of this embodiment is that, during the assembly or repair process, the bracket and hard disk drive mounted thereon are slowly rotated to a secured position due to the presence of a spring which functions as a friction brake and prevents the bracket from slamming into the secured position and causing potential shock damage to the hard disk drive.

DETAILED DESCRIPTION OF THE PREFERRED EMBODIMENT

Figure 1:
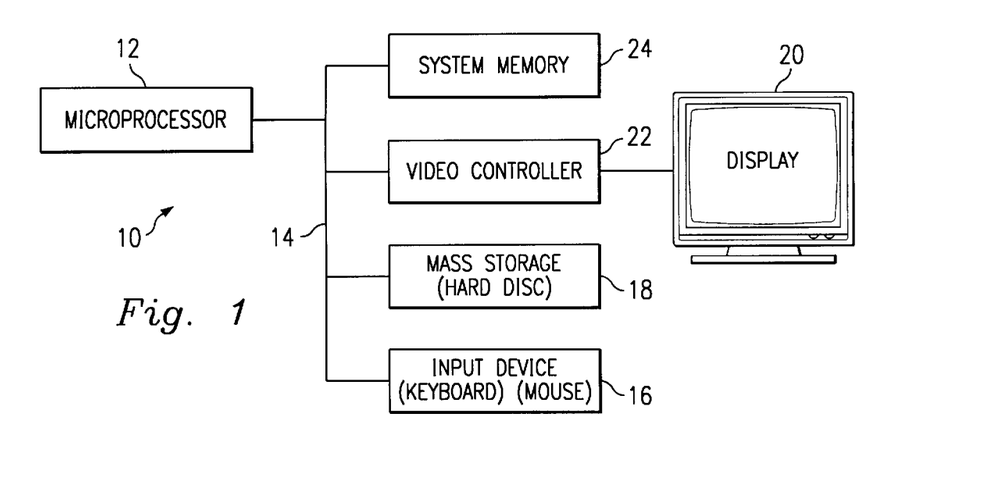
FIG. 1 is a diagrammatic view illustrating an embodiment of a typical computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
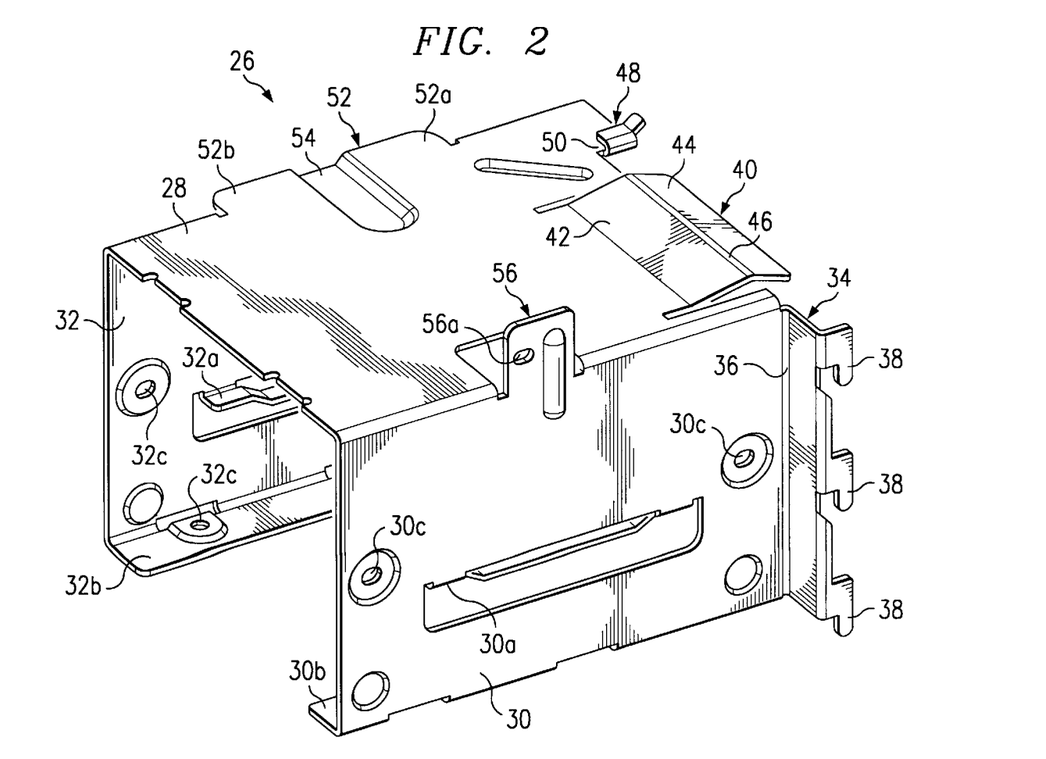
FIG. 2 is an isometric view illustrating an embodiment of a hard disk drive mounting bracket.

A bracket 26, FIG. 2, is provided for use in computer system 10. Bracket 26 houses a plurality of hard disk drives (not shown) which are mounted in a stacked relationship within bracket 26. Bracket 26 is formed of a metal such as steel, and includes a top surface 28, which is substantially planar, and a pair of opposed sides 30 and 32. A hinge 34 is formed on one end 36 of side 30 and includes a plurality of hooks 38 for rotating attachment of bracket 26 to a computer chassis (discussed below).

Top surface 28 includes a resilient tab 40 which functions as a spring and is deformed to extend from surface 28 and includes a first portion 42 and a second portion 44. A bend 46 between portions 42 and 44 forms a resilient surface for engagement with a computer chassis (discussed below). An alignment tab 48 extends from surface 28 and is folded over to form a "U" shaped groove 50 between tab 48 and surface 28. A securing tab 52 also extends from surface 28 and is substantially planar therewith. Securing tab 52 includes portions 52a, 52b separated by a reinforcing bend 54 formed in securing tab 52. A pair of hard disk drive support ledges 30a, 30b are provided on side 30 and a plurality of hard disk drive attachment screw apertures 30c are formed therein. A similar pair of hard disk drive support ledges 32a, 32b are provided on side 32 and a plurality of hard disk drive attachment screw apertures 32c are formed therein. A chassis attachment tab 56 extends from side 30 and includes a chassis attachment screw aperture 56a formed therein.

Figure 3:
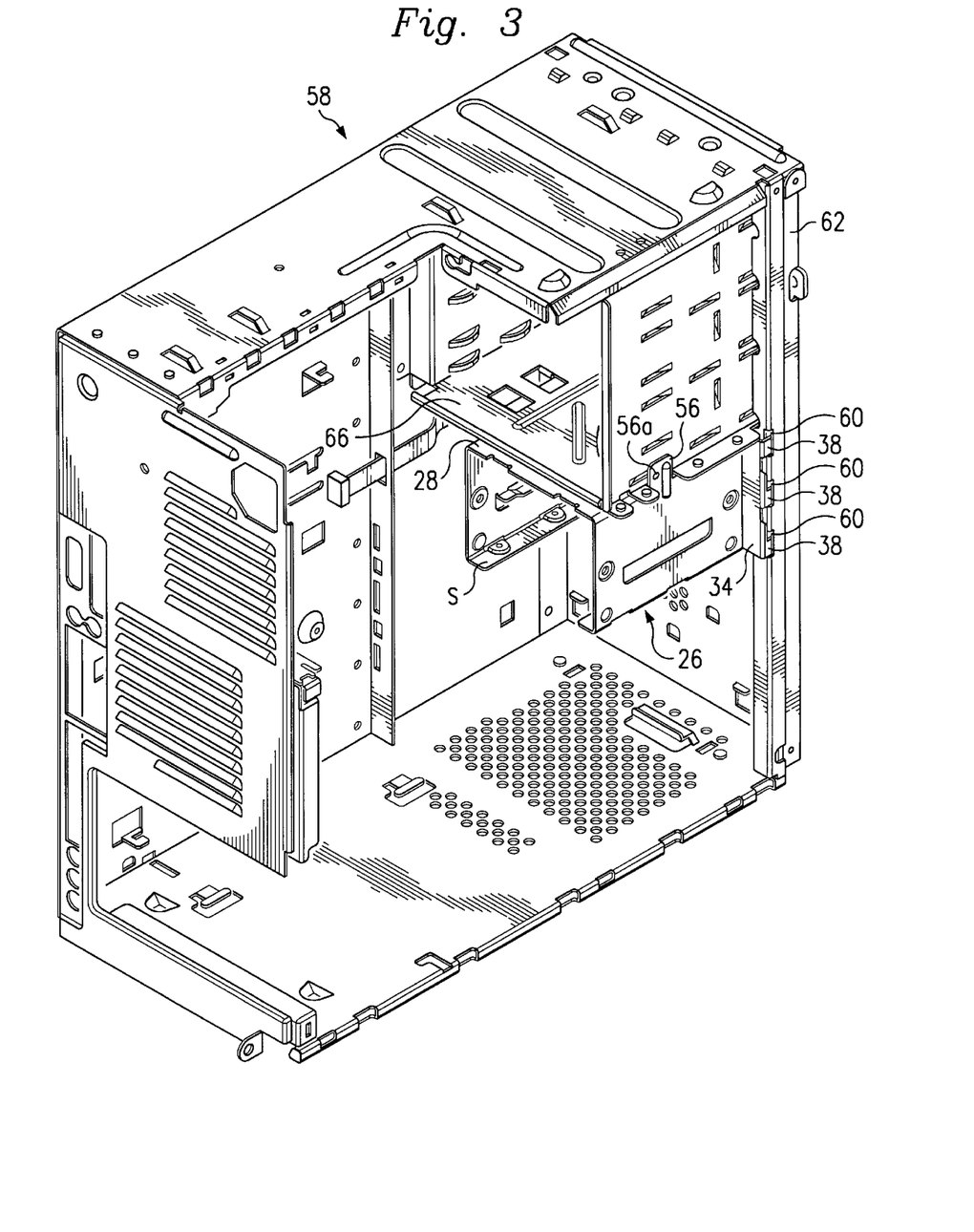
FIG. 3 is an isometric view illustrating an embodiment of a computer chassis having a hard disk drive bracket attached and in a secured position.

Bracket 26 is provided to be rotatably mounted in a computer chassis 58, FIG. 3, by means of hinge 34 having hooks 38 engaged with a plurality of mating slots 60 in a front surface 62 of chassis 58. In this manner, bracket 26 is rotatable between an open position (discussed below) and a secured position "S" as shown in FIG. 3. In the secured position "S," bracket 26, positions hard disk drives (not shown), which may be mounted in bracket 26, adjacent front surface 62 for access via well-known drive bays which are formed in a bezel (not shown) which covers front surface 62. When bracket 26 is secured position "S," a screw (not shown) can be inserted into chassis 58 through screw aperture 56a of chassis attachment tab 56.

Figure 4:
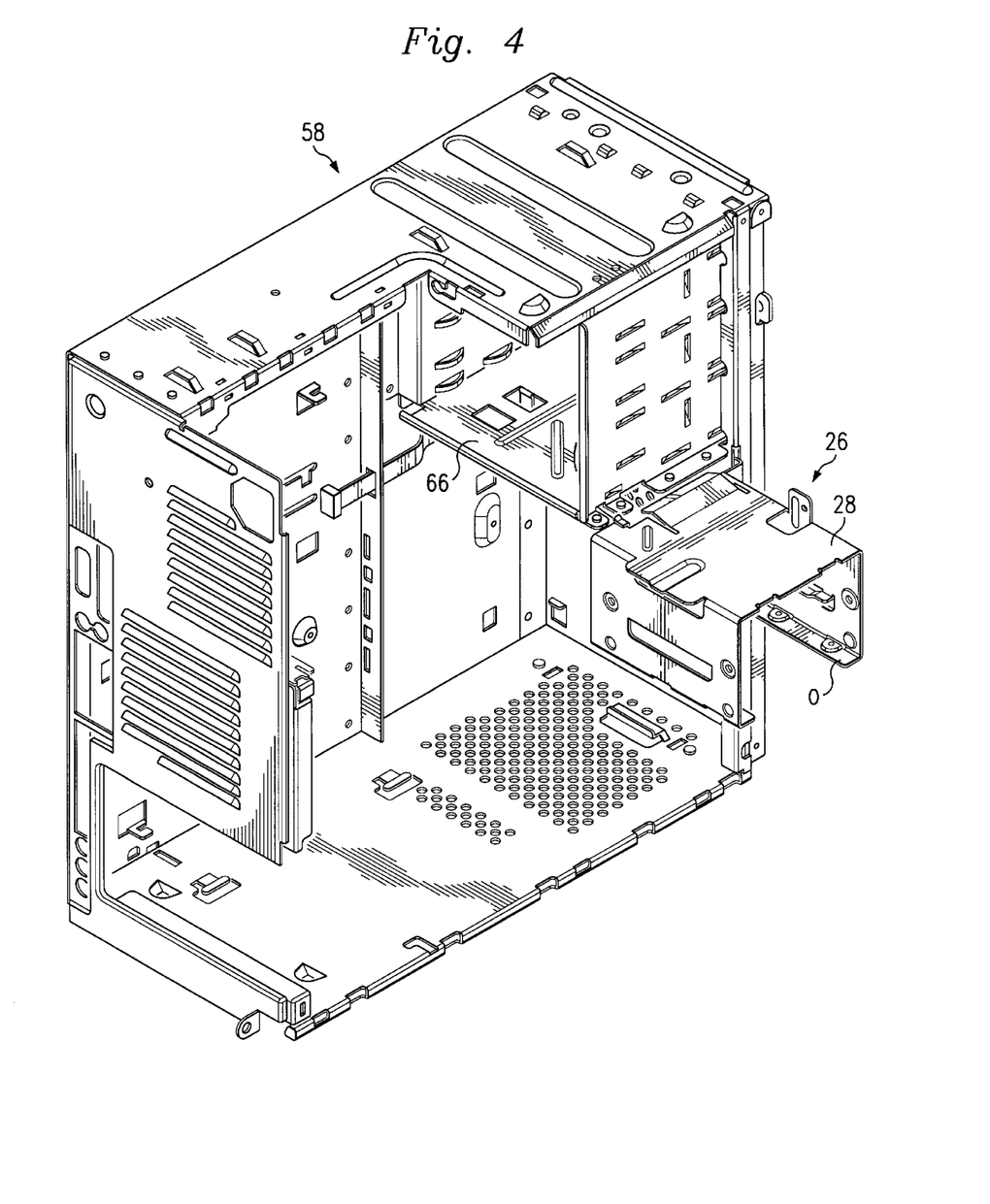
FIG. 4 is an isometric view illustrating an embodiment of a computer chassis having a hard disk drive bracket attached and in an open position.

In FIG. 4, bracket 26 is illustrated as rotated to an open position "O" for installation, repair or removal of hard disk drives (not shown) which may be mounted in bracket 26. It can be seen in FIGS. 3 and 4 that when bracket 26 is rotated into secured position "S," top planar surface 28 of bracket 26 is immediately adjacent a planar surface 66 of chassis 58.

Figure 5:
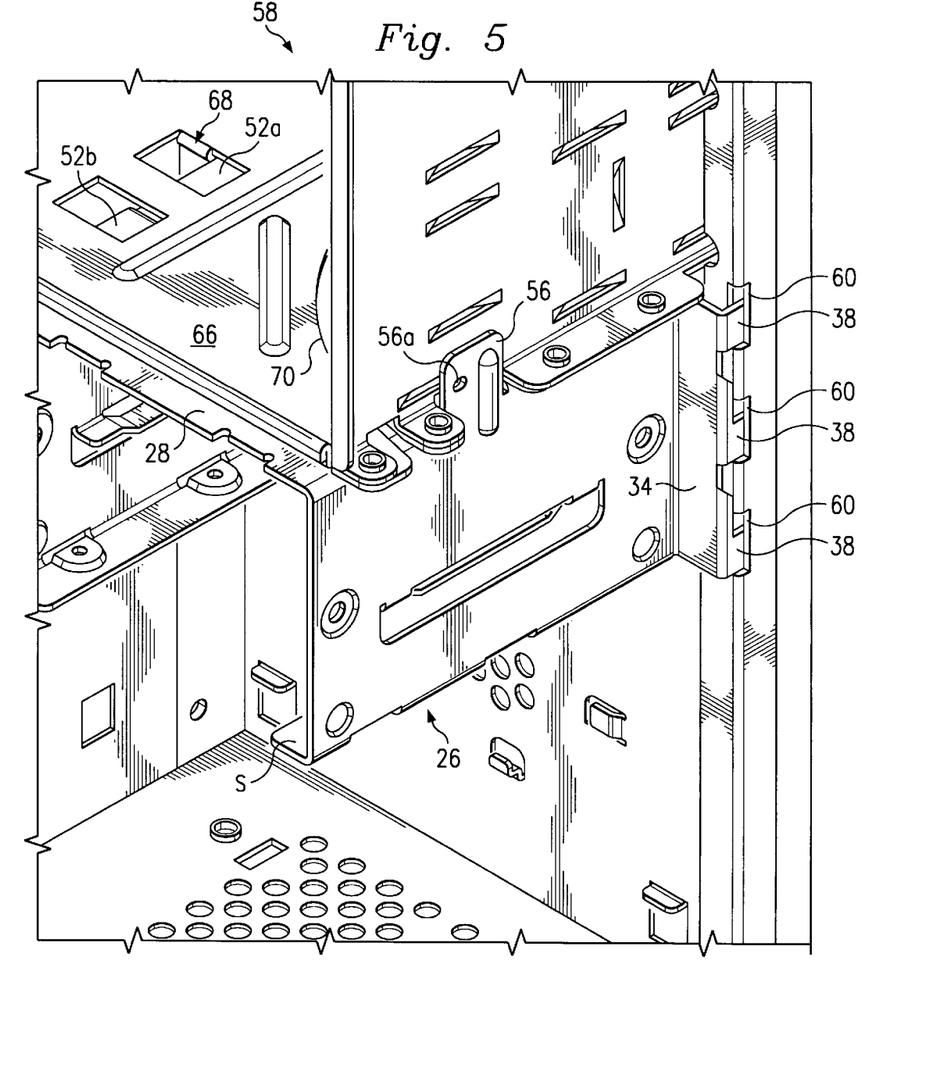
FIG. 5 is an enlarged partial isometric view illustrating an embodiment of a computer chassis having a hard disk drive bracket attached and in a secured position.

In FIG. 5, bracket 26 is again illustrated in secured position "S." Hooks 38 of hinge 34 are inserted into mating slots 60 for rotational movement of bracket 26 relative to chassis 58. Attachment tab 56 is in abutment with a portion of chassis 58 positioned for the above-mentioned screw attachment via screw aperture 56a. Planar surface 66 of chassis 58 and adjacent planar surface 28 of bracket 26 are engaged due to securing tab portions 52a, 52b being engaged with a slotted receiver 68 (partially shown) on surface 66 and due to alignment tab 48 (not shown in FIG. 5) moving within a guide slot 70 (partially shown) formed in surface 66. Resilient tab 40 (not shown in FIG. 5) is urged against surface 66.

Figure 6:
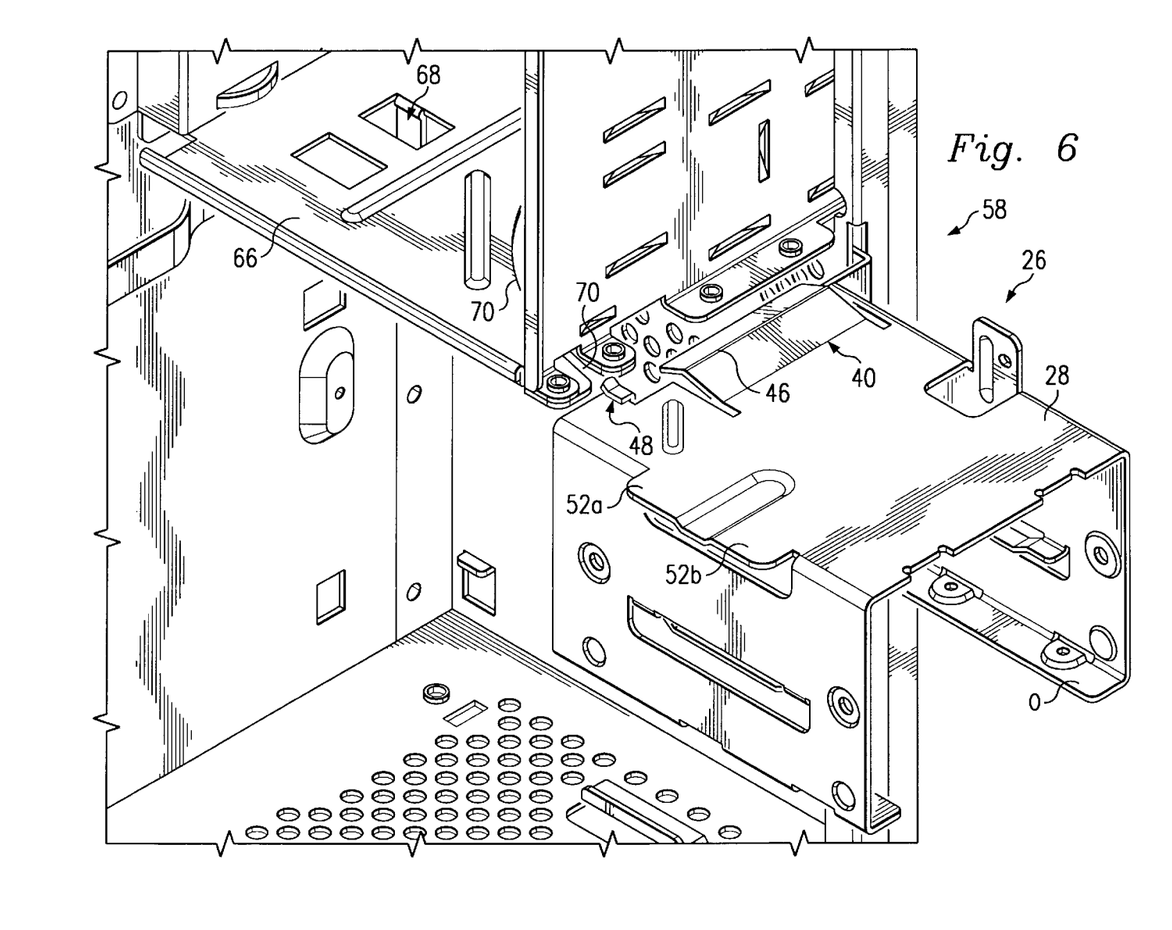
FIG. 6 is an enlarged partial isometric view illustrating an embodiment of a computer chassis having a hard disk drive bracket attached and in an open position.

In FIG. 6, bracket 26 is illustrated in open position "O." Planar surface 28 of bracket 26 is rotated away from planar surface 66 of chassis 58. Securing tab portions 52a, 52b are out of engagement with slotted receiver 68 and alignment tab 48 is positioned adjacent guide slot 70. Resilient tab 40 is free of engagement with surface 66 of chassis 58.

Figure 7:
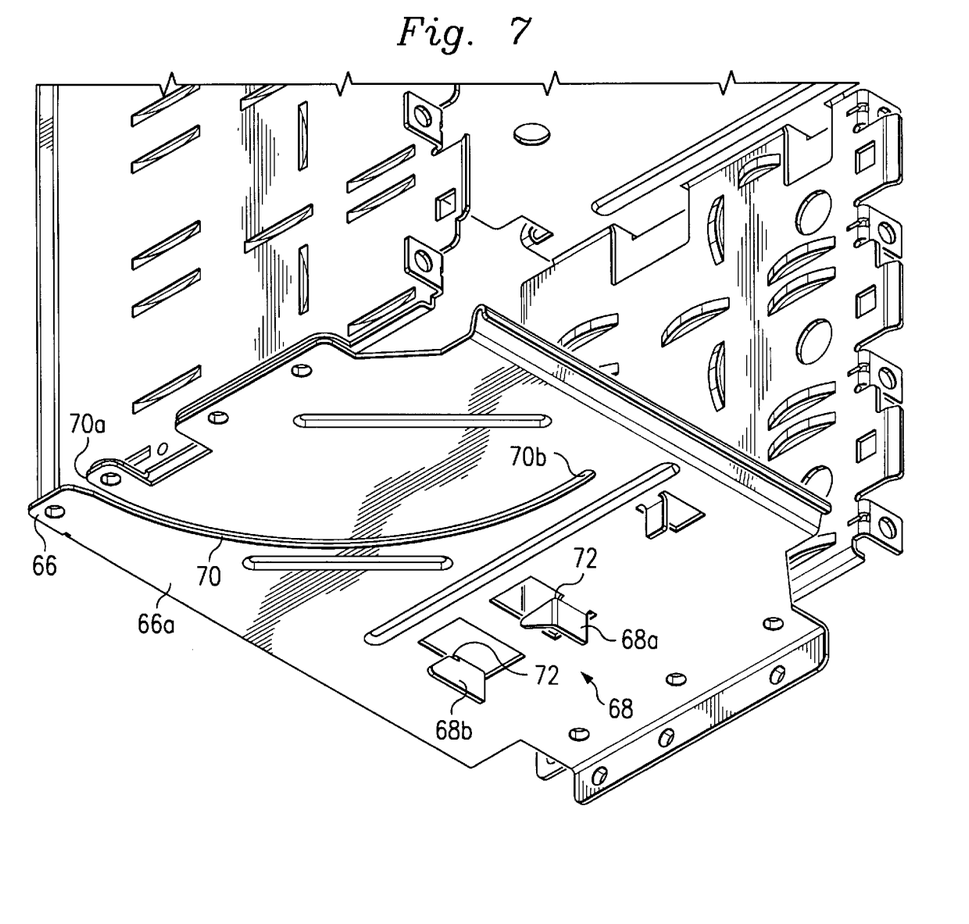
FIG. 7 is an enlarged partial isometric view illustrating an embodiment of a computer chassis having a plate for receiving the hard disk drive bracket.

In FIG. 7, a view of a bottom face 66a of planar surface 66 is illustrated. Face 66a includes slotted receiver 68 extending therefrom. As illustrated in the embodiment of FIG. 7, slotted receiver 68 includes a portion 68a and also includes a portion 68b. Slots 72 in portions 68a and 68b receive the tab portions 52a and 52b, respectively (not shown in FIG. 7). Guide slot 70 is arcuate and extends from an open end 70a to a closed terminal end 70b.

Figure 8:
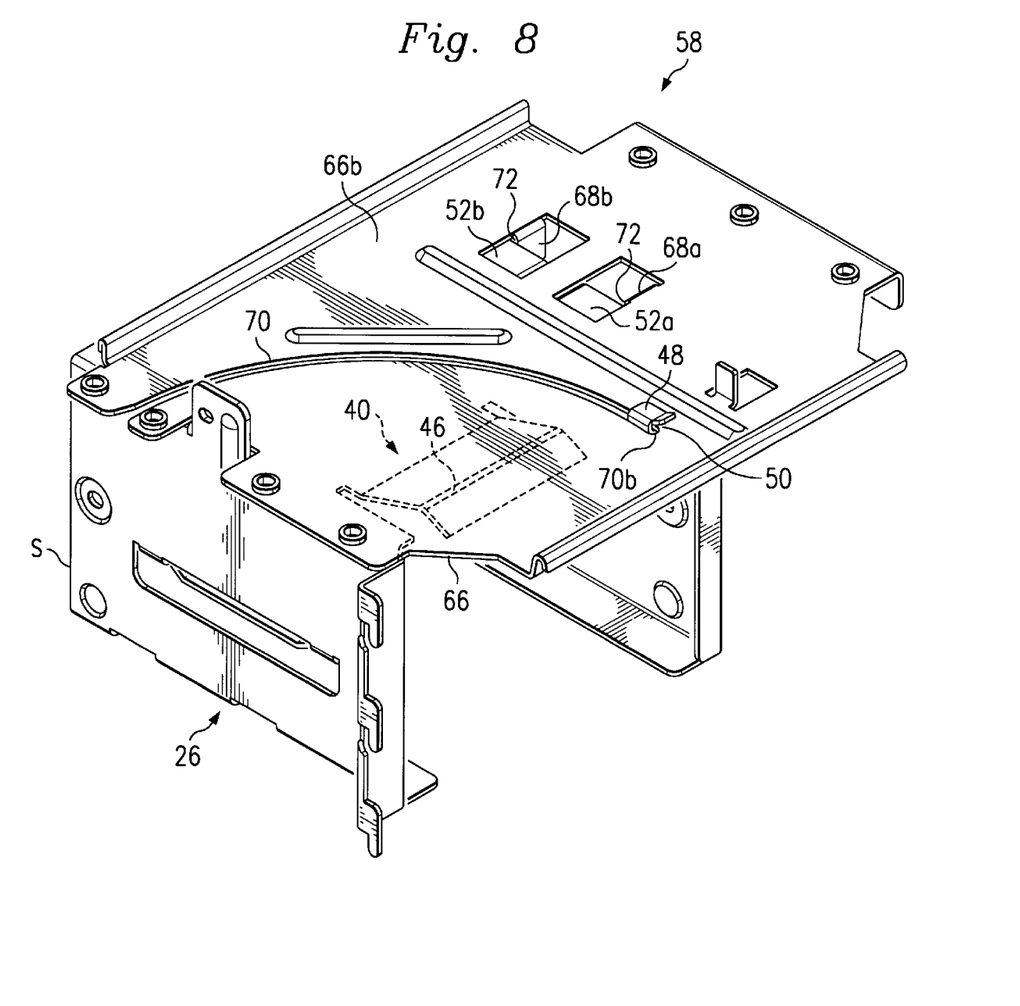
FIG. 8 is an enlarged partial isometric view illustrating an embodiment of a computer chassis having a plate and an attached hard disk drive bracket in a secured position.

In FIG. 8, bracket 26 is illustrated in secured position "S" relative to planar surface 66 of chassis 58. A view of a top face 66b of planar surface 66 is illustrated. Top face 66b is opposite bottom face 66a (see FIG. 7). Again in FIG. 8, alignment tab 48 is engaged with guide slot 70 at closed terminal end 70b by means of surface 66 being received in groove 50 of alignment tab 48. Securing tab portions 52a, 52b are in secured engagement with slots 72 of slotted receiver portions 68a, 68b, respectively. Bend surface 46 of resilient tab 40 (illustrated in phantom) is in compression urged against face 66a of surface 66.

In operation, hard disk drives may be mounted in bracket 26 when bracket 26 is in open position "O." Bracket 26 may then be rotated to position "S." During rotation, alignment tab 48 travels an arcuate path defined by engagement with groove guide 70. Simultaneously, bend surface 46 of resilient tab 40 is slidably moved along in a compressed resilient engagement with face 66a of planar surface 66 so that resilient tab 40 functions as a friction brake between bracket 26 and chassis 58. When bracket 26 reaches position "S," alignment tab 48 is positioned at closed terminal end 70b of guide slot 70 and securing tab portions 52a, 52b are respectively engaged with slotted receiver portions 68a, 68b.

As it can be seen, the principal advantages of these embodiments are that the resilient tab functions as a friction brake between the relatively movable hard disk drive bracket and the chassis, which prevents the bracket from inadvertently rotating into the secured position and causing potential shock damage to a hard disk drive or drives mounted therein. The alignment tab and securing tab add stability to the bracket which would otherwise be cantilever mounted on the chassis at the hinge. The anti-slamming protection feature is of benefit during initial assembly and subsequent servicing of the computer chassis.

Although illustrative embodiments have been shown and described, a wide range of modifications, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer comprising:

a chassis, at least one hard disk drive disposed in the chassis, a mounting bracket adapted to receive the at least one hard disk drive for pivotally mounting the hard disk drive within the chassis, at least one hinge tab of the mounting bracket for engaging the chassis, wherein the at least one hinge tab allows the mounting bracket to pivot between an open position and a secured position in the chassis, and an extrusion associated with the mounting bracket for engaging the chassis, wherein during pivotal motion of the mounting bracket between the open position and the secured position, the extrusion is compressed against the chassis, frictionally retarding the pivotal motion.

2. The computer of claim 1 wherein the chassis has at least one slot to receive the at least one hinge tab of the mounting bracket.

3. The computer of claim 1 further comprising:

a securing tab of the mounting bracket for engaging the chassis, wherein the securing tab is only engaged with the chassis when the mounting bracket is in the secured position, and an attachment tab of the mounting bracket for affixing to the chassis when the mounting bracket is in the secured position.

4. The computer of claim 1 further comprising a hook and slot arrangement comprising:

a hook disposed on the mounting bracket, and a corresponding hook slot disposed on the chassis, the hook slot including an open portion that receives the hook and a curved portion that guides the hook during pivotal movement of the mounting bracket between the open position and the secured position relative to the chassis.

5. The computer of claim 4 wherein the hook and hinge tabs support the mounting bracket during movement of the mounting bracket between the open position and the secured position relative to the chassis.

6. A computer comprising:

a chassis:

at least one hard disk drive disposed in the chassis; and a mounting bracket adapted to receive the at least one hard disk drive for pivotally mounting the hard disk drive within the chassis; the mounting bracket comprising at least one hinge tab for engaging the chassis to allow the mounting bracket to pivot between an open position and a secured position in the chassis, an extrusion for engaging the chassis, so that, during pivotal motion of the mounting bracket between the open position and the secured position, the extrusion is compressed against the chassis to frictionally retard the pivotal motion, a securing tab for engaging the chassis, only when the mounting bracket is in the secured position, and an attachment tab for affixing to the chassis when the mounting bracket is in the secured position.

7. The computer of claim 6 wherein the chassis has at least one slot to receive the at least one hinge tab of the mounting bracket.

8. The computer of claim 7 further comprising a hook and slot arrangement comprising:

a hook disposed on the mounting bracket, and a corresponding hook slot disposed on the chassis, the hook slot including an open portion that receives the hook and a curved portion that guides the hook during movement of the mounting bracket between the open position and the secured position relative to the chassis.

9. The computer of claim 8 wherein the hook and hinge tabs support the mounting bracket during movement of the mounting bracket between the open position and the secured position relative to the chassis.

10. A computer comprising:

a chassis;

at least one hard disk drive disposed in the chassis;

a mounting bracket adapted to receive the at least one hard disk drive for pivotally mounting the hard disk drive within the chassis; the mounting bracket comprising at least one hinge tab for engaging the chassis to allow the mounting bracket to pivot between an open position and a secured position in the chassis, an extrusion for engaging the chassis, so that, during pivotal motion of the mounting bracket between the open position and the secured position, the extrusion is compressed against the chassis to frictionally retard the pivotal motion, and a hook and slot arrangement comprising a hook disposed on the mounting bracket, and a corresponding hook slot disposed on the chassis, the hook slot including an open portion for receiving the hook and a curved portion that guides the hook during movement of the mounting bracket between the open position and the secured position relative to the chassis.

11. The computer of claim 10 wherein the chassis has at least one slot to receive the at least one hinge tab of the mounting bracket.

12. The computer of claim 11 further comprising:

a securing tab of the mounting bracket for engaging the chassis, wherein the securing tab is only engaged with the chassis when the mounting bracket is in the secured position, and an attachment tab of the mounting bracket for affixing to the chassis when the mounting bracket is in the secured position.

13. A method for mounting a hard disk drive mounting bracket unit in a computer unit comprising the steps of:

inserting hinge tabs of one unit into openings in the other unit, inserting a hook of one unit into a curved slot of the other unit, wherein insertion is at an open portion of the curved slot, compressing an extrusion associated with one unit to frictionally engage the other unit, pivoting one unit relative to the other unit, wherein said movement is guided by the hook moving along the curved slot, and engaging a securing tab on one unit and a receiver on the other unit.

\* \* \* \* \*